May 26, 1931.  W. R. HUME  1,807,477
WELDED ARTICLE
Filed Sept. 6, 1928
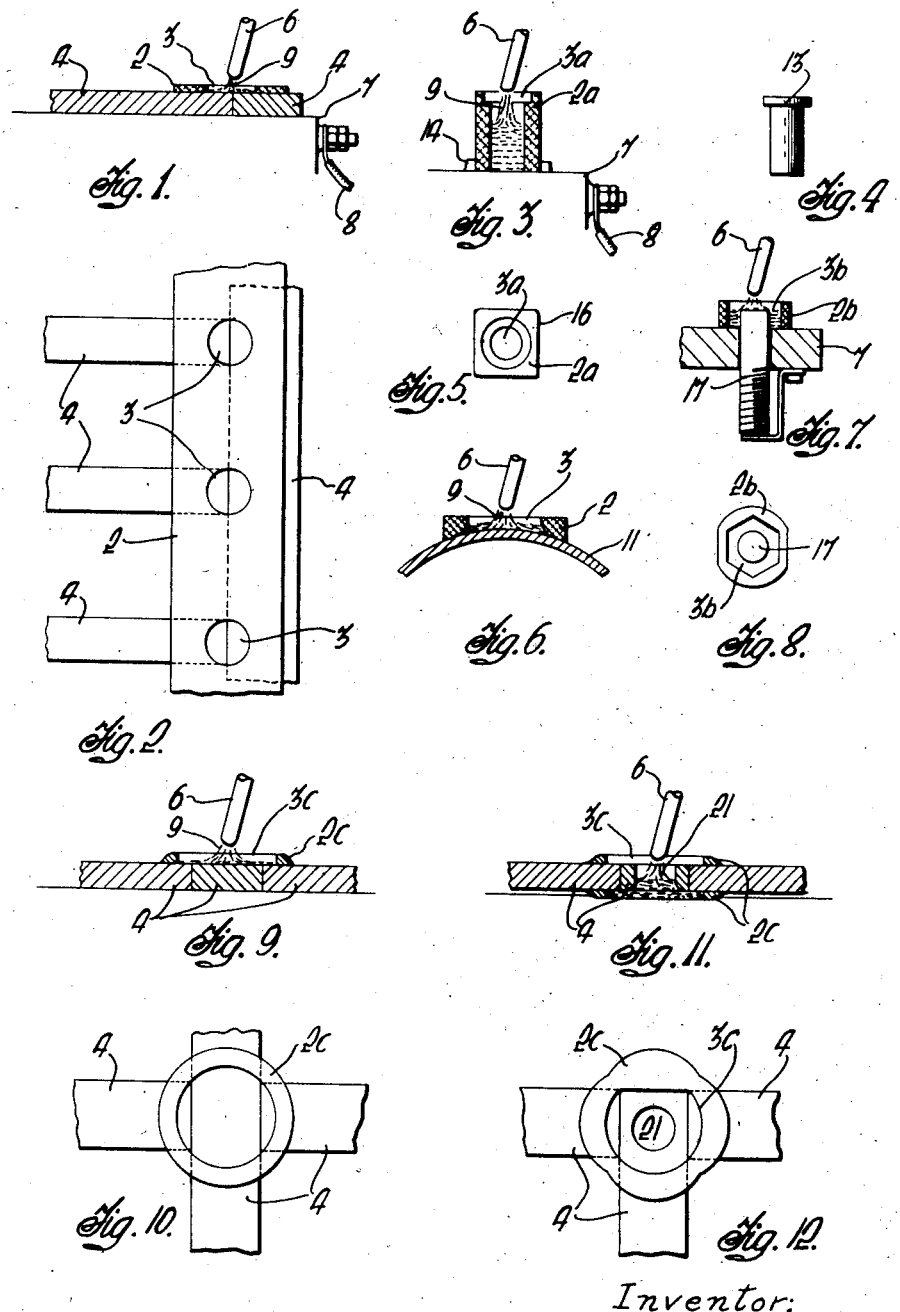
Inventor:
Walter Reginald Hume
By Emil Bönnelyke
Attorney Patented May 26, 1931

1,807,477

UNITED STATES PATENT OFFICE

WALTER REGINALD HUME, OF MELBOURNE, VICTORIA, AUSTRALIA

WELDED ARTICLE

Application filed September 6, 1928, Serial No. 304,265, and in Australia November 22, 1927.

This invention relates to the process of electric arc welding or metal deposition wherein a fusible electrode is employed to unite the parts or to deposit molten metal upon the desired object or surface. The invention is particularly applicable to the manufacture of fences, barriers, gates, frames and other structures built up of, or comprising metal rods, bars or the like, electrically welded to each other at their contacting or abutting portions.

According to the invention a mould element having a hole or passageway therethrough is placed upon the desired work or supporting member, and molten metal from a fusible electrode is directed into said hole or passage so as to be impounded within the mould element and assume the internal shape thereof. In some instances the mould element is composed of copper or other material which exercises a chilling effect on the molten metal so that after the latter has set the mould may be removed, thus leaving a neat weld or moulded projection of the desired form upon the work or object. In other instances the mould element may be composed of such material that it becomes homogenously united with the deposited molten metal and the work upon which the mould is positioned.

If the molten metal is to form a joint or be otherwise permanently deposited on the surface of another metal object, the mould element is laid upon the desired surface at the point where the weld is to be formed so that the molten metal is securely welded to the desired surface after which the mould may be removed or left in situ as above mentioned.

In the formation of welded joints and the like the invention has the distinct advantage that the welding arc and the molten metal are concentrated upon the desired point or area, so that effective penetration is ensured and the spreading of the molten metal in the form of objectionable blisters or adhesions which impair the efficiency and appearance of the weld, is obviated. Furthermore the time and labor involved in filing or smoothing off such projections or adhesions as is usually necessary under existing circumstances may be obviated by the invention.

In the fabrication of fences, barriers, gates and other structures built up of metal rods, bars or like members, considerable difficulties are at present experienced in electrically welding together the adjacent or abutting ends of said members. It is especially difficult, at present, to obtain welds of adequate penetration and of neat or ornamental appearance owing to the fact that the molten metal deposited from the electrode frequently forms blisters and other irregularities which detrimentally affect the quality or strength of the weld and the appearance of the structure.

Another objection at present attendant on the manufacture of such structures is that, although it may involve comparatively little time and labor to weld the adjacent members together, excessive time and labor is required to clean off the irregularities or adhesions which have arisen during the welding operation. Furthermore, in the event of pockets or cavities being formed in the members at or adjacent the welding zone, the cavities require to be filled in with putty or other filling substances before the structures are coated with paint.

The present invention may be applied with particular advantage to the manufacture of such metal structures and enables the various members thereof to be effectively welded together with a minimum of labour and time and without any distortion of the members. In such instances a mould element is laid upon the abutting ends of the members to be joined with the hole of the mould encompassing the welding zone. Molten metal from the electrode is directed into the hole or passage of the mould which may either be subsequently removed, or may become welded in position so as to reinforce the joint and form an ornament at the junction of the members. The welding operations are thus simplified and the appearance of the structures greatly improved.

Referring to the drawings which form part of this specification:—

Figure 1 illustrates one manner of utilizing a chill mould to form a welded joint in accordance with the invention.

Figure 2 is a plan of the mould and the parts to be joined as seen in Figure 1.

Figure 3 illustrates the manner of forming a pin with the aid of a chill mould, in accordance with the invention.

Figure 4 shows a pin such as may be formed in accordance with Figure 3.

Figure 5 is a plan of the mould element seen in Figure 3.

Figure 6 illustrates an application of the invention to form a boss upon the exterior of a metal article.

Figure 7 illustrates an application of the invention for moulding a head upon a screw.

Figure 8 is a plan of the mould seen in Figure 7.

Figure 9 illustrates an application of the invention for making a welded joint at the intersection of a plurality of bars, the mould in this instance being intended to form part of the joint.

Figure 10 is a plan of the intersecting bars and the mould seen in Figure 9.

Figure 11 illustrates a modification of Figure 9 and shows moulds at opposite sides of the bars and the manner of forming a welded joint which includes both moulds.

Figure 12 illustrates a mould of ornamental form suitable for use in the welding together of parts so as to form an embellishment at the welding zone.

In welding two or more parts together a mould element 2 having a hole 3 extending therethrough of the required area and shape is placed upon the members 4 to be welded together so that the hole encircles the welding zone as indicated in Figures 1 and 2. To facilitate operations the mould may consist of a strip provided with a number of holes at appropriate positions. Molten metal from a fusible electrode 6 is directed into the hole 3 so that it is impounded therein and takes the internal shape of the mould. When the molten metal is sufficiently set the mould can be removed leaving a neat weld or moulded projection at the junction of the united members 4. During the welding and moulding operations the members to be united may rest upon a suitable support 7, to which one of the conductors 8 of the welding circuit may be connected, the work or the mould forming one of the terminals of the welding arc. Another conductor may be connected to the electrode 6 which forms the other terminal of the arc in accordance with the usual practice. By adopting the foregoing method the molten metal 9 is concentrated upon the desired area, and the formation of extraneous projections is avoided, thus ensuring effective penetration and a strong, neat joint which requires little or no filing or finishing off.

Where the moulds are intended to be removed after the moulding of the molten metal, they are preferably composed of copper or other material which has a chilling effect upon the deposited molten metal.

In applying the invention to the welding together of metal bars, rods or other members of fences, barriers, gates and such like structures, the mould elements may be united to the members by the welding action so as to form ornaments which surround the deposited molten metal at the intersections of the members and thus improve the appearance of the structures. In such instances the moulds 2c (Figs. 9 to 12) are composed of some material which is conducive to welding. As seen in Figures 9 and 10 one of such ornamental moulds 2c may be placed over the intersection of the members 4 to be united and molten metal 9 deposited from the electrode 6 into the hole 3c of the mould so as to fill same and weld the members together, the joint being reinforced and its appearance enhanced owing to the mould being permanently secured in position around the deposited metal. In such applications the mould may if desired be preliminarily secured to the intersecting members by spot welding or other means prior to the deposition of the molten metal.

An additional mould 2c may be applied at the opposite side of the intersection in a manner similar to that described, but if desired two moulds may be used simultaneously one at each side of the intersecting members 4 as seen in Figure 11, a passage 21 being formed through one of the members 4 to enable the molten metal to pass into the moulding space of the underneath mould. The passage 21 is itself subsequently filled with molten metal and eventually the moulding space of the upper mould is filled.

It is to be understood that the moulds which are intended to remain permanently around the deposited metal may be of any desired ornamental shape, configuration, or pattern one of which is indicated for example in Figure 12. It is also to be understood that the holes or passages of the moulds need not be circular nor centrally disposed.

Having now described my invention what I claim as new and desire to secure by Letters Patent is:—

1. A frame or like structure comprising a series of metal bars arranged at an angle to and with their ends in abutted contact with other metal bars of the structure, the abutting or intersecting portions of said bars being joined together by means of mold elements which are positioned against the substantially flush faces of said bars, each of said mold elements having an outer edge corresponding in shape to the marginal form of the joint, and a passage through the mold element encompassing said abutting or intersecting portions of the angularly disposed bars, said passage being filled with deposited weld metal which is homogeneously united to said mold element and forms therewith a composite projection welded to said bars.

2. A structure according to claim 1, wherein said mold elements are positioned against the surfaces of said bars around the abutting or intersecting portions thereof at opposite sides of the joints, the passages through opposite mold elements being connected by a passage formed through one of the abutting or intersecting portions of said bars so that the deposited weld metal extends through said last-named passage between the opposite mold elements.

In testimony whereof I affix my signature.

WALTER REGINALD HUME.